July 6, 1954  W. J. DONNELLY  2,682,792
CUTTER MOUNTED ON TAPERED SHANK
Filed March 30, 1953
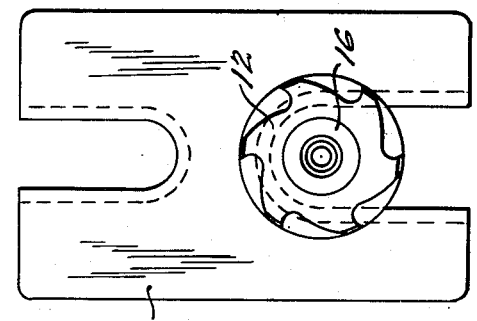
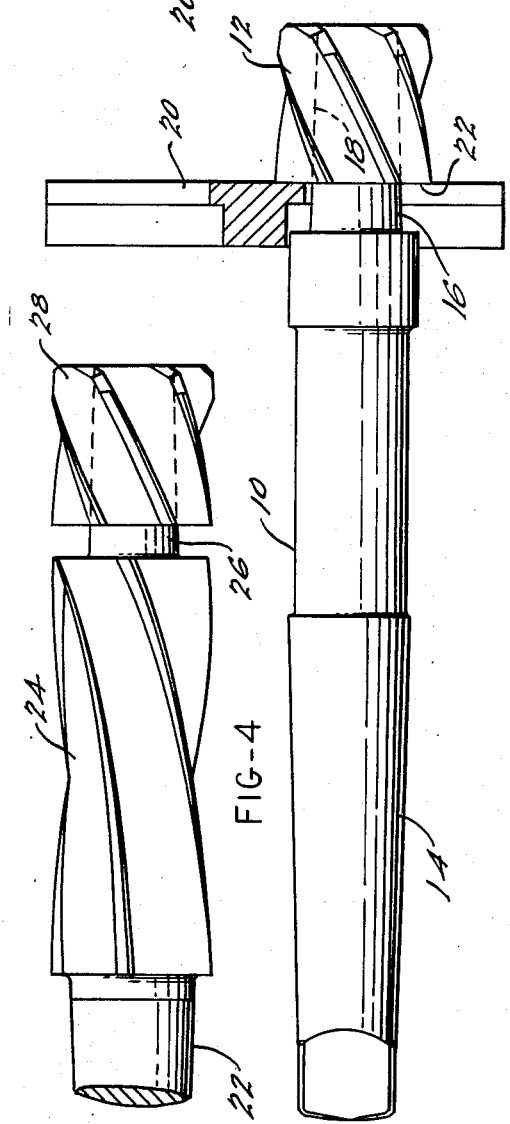
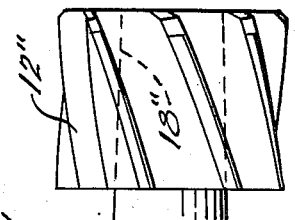
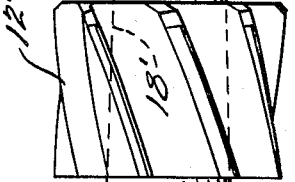
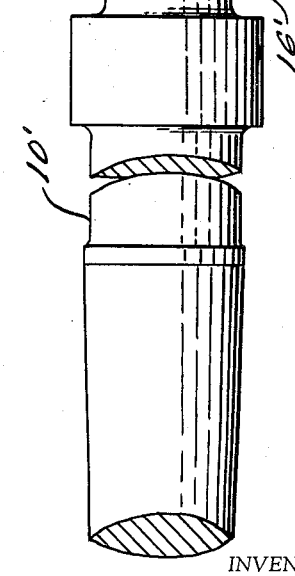
INVENTOR
*Walter I. Donnelly.*
BY
ATTORNEY Patented July 6, 1954

2,682,792

UNITED STATES PATENT OFFICE 2,682,792

CUTTER MOUNTED ON TAPERED SHANK

Walter J. Donnelly, Jackson, Mich., assignor to Tomkins-Johnson Company, Jackson, Mich., a corporation of Michigan Application March 30, 1953, Serial No. 345,466

1 Claim. (Cl. 77—72)

The present invention relates to improvements in cutting tools such as reamers, drills and similar tools which are conventionally manufactured from an integral bar with the cutting head being machined from one end of the bar and the attachment shank from the other end.

It is the object of the invention to materially reduce the cost of replacement of reamers, drills and the like by providing interchangeable cutting heads with one or more of the heads being mounted upon a separate shank with a pressed tapered fit.

In practice, the separate shank may be fabricated from a less expensive material than the cutting heads with one end of the shank preferably having a Morse taper for supporting and driving the tool in the machine in which it is used. The other end of the shank is also tapered to receive the cutting head or heads. Preferably, a Brown & Sharpe taper is used on the tool end of the shank. For example, with ½" to 1⅛" reamer heads a No. 1 B. & S. taper is satisfactory. For ¾" to 1⅜" reamers a No. 4 B. & S. taper is satisfactory. With 1¾" to 2¾" reamers a No. 9 B. & S. taper is recommended. The cutting heads have tapers corresponding to the taper of the tool end of the shank to permit the heads to be forced upon the shank with a driving fit yet readily removable for replacement or change of cutting tools.

The present invention also anticipates the reworking of worn tools by grinding the ends of the tools to provide a tapered end upon which a new tool head may be mounted.

In the drawings,

Fig. 1 is a side elevational view of the invention with a knock-off plate shown in position for removing the cutting head.

Fig. 2 is a view similar to Fig. 1 showing a pair of reamer heads mounted upon the same shank in tandem, Fig. 3 is an end view of Fig. 1, and Fig. 4 is a view similar to Fig. 2 of a reworked reamer having a removable cutter head applied thereto.

Referring to the drawings, the shank 10 may be separately machined from a less expensive steel than the reamer head 12. The end 14 of the shank 10 preferably has a Morse taper of the proper size which is determined by the size of the cutting tool while the end 16 may have a Brown & Sharpe taper with the bore 18 of the head 12 similarly tapered to permit the mounting of the head 12 to the end 16 with a driving yet removable fit. When the removal of the reamer head 12 is desired a knock-off plate 20 of the proper shape and size to straddle the end 16 and abut the back end 22 of the head 12 is positioned and sharply stuck with a hammer or other tool to drive the head 12 from the tapered end 16.

In Fig. 2, a pair of separate reamer heads 12' and 12" having tapered bores 18' and 18" are shown mounted upon the similarly tapered end 16' of the shank 10'. With such an arrangement, the reaming length of the tool may be increased as desired. Also, it provides a simple method of staggering the flute of a reaming tool to improve finish and reduce chatter. It will also be obvious to those skilled in the art that the heads 12' and 12" may be of different outside diameter to provide a step reaming tool or a step drill or other similar tool. It is further anticipated that the tandem arrangement of heads upon the end 16' may include a piloting head in lieu of a head having cutting surfaces.

In Fig. 4, a worn reamer 22, with flutes 24 worn slightly undersize, has been placed on centers and a tapered shank 26 ground to receive the removable cutter head 28. With this method of reworking worn tools, only the worn portion is replaced with a substantial saving in cost as compared with replacing the entire tool.

Having thus described my invention what I claim is new and desire to protect by Letters Patent is:

A tool of the type described comprising a separate shank having a tapered end to receive with a driving yet removable fit a cutting head or the like having a bore of similar taper, a separate cutting head or the like having a bore tapered similarly to said tapered end and forced upon said end to provide a driving fit between said head and shank, said cutter head having a driving engagement with said tapered end solely through the engaging tapered surfaces of said tapered end and said bore with said cutter head otherwise having clearance with said shank.

References Cited in the file of this patent

UNITED STATES PATENTS

| Number | Name | Date |
|--------|------|------|
| 906,656 | Peck | Dec. 15, 1908 |
| 1,472,798 | Gylisdorff | Nov. 6, 1923 |
| 1,620,536 | Gairing | Mar. 8, 1927 |
| 2,303,487 | Miller | Dec. 1, 1942 |